United States Patent
Iwamura et al.

(10) Patent No.: US 9,131,409 B2
(45) Date of Patent: Sep. 8, 2015

(54) METHOD AND MOBILE STATION TO CHANGE AND REMOVE A MEASUREMENT ID FOR SUPPORTING CARRIER AGGREGATION

(75) Inventors: Mikio Iwamura, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 225 days.

(21) Appl. No.: 13/643,556

(22) PCT Filed: Apr. 28, 2011

(86) PCT No.: PCT/JP2011/060360
§ 371 (c)(1),
(2), (4) Date: Dec. 10, 2012

(87) PCT Pub. No.: WO2011/136322
PCT Pub. Date: Nov. 3, 2011

(65) Prior Publication Data
US 2013/0070680 A1  Mar. 21, 2013

(30) Foreign Application Priority Data
Apr. 30, 2010   (JP) ................. 2010-106003

(51) Int. Cl.
| | | |
|---|---|---|
| H04B 7/00 | (2006.01) |
| H04L 12/28 | (2006.01) |
| H04J 3/00 | (2006.01) |
| H04W 36/00 | (2009.01) |
| H04W 24/10 | (2009.01) |
| H04L 12/54 | (2013.01) |

(Continued)

(52) U.S. Cl.
CPC .............. *H04W 36/00* (2013.01); *H04W 24/10* (2013.01); *H04L 12/5602* (2013.01); *H04L 47/10* (2013.01); *H04L 47/15* (2013.01); *H04W 36/0094* (2013.01); *H04W 80/04* (2013.01); *H04W 84/08* (2013.01)

(58) Field of Classification Search
CPC ..... H04L 47/10; H04L 47/15; H04L 12/5602; H04L 5/14; H04W 80/04; H04W 36/18
USPC ........................................... 370/328
See application file for complete search history.

(56) References Cited

U.S. PATENT DOCUMENTS

| | | | |
|---|---|---|---|
| 2011/0292911 A1* | 12/2011 | Uemura et al. | 370/331 |
| 2012/0155408 A1* | 6/2012 | Pedersen et al. | 370/329 |
| 2012/0294694 A1* | 11/2012 | Garot | 411/427 |

OTHER PUBLICATIONS 6.2.1.3, NTT DOCOMO, Inc. Measurement handling at inter-frequency handover, Oct. 2008.*

(Continued)

*Primary Examiner* — Faruk Hamza
*Assistant Examiner* — Abu-Sayeed Haque
(74) *Attorney, Agent, or Firm* — Osha Liang LLP (57) ABSTRACT

A mobile communication method according to the present invention includes the steps of: (A) transmitting, from a mobile station (UE) to a radio base station (eNB), a "Measurement Report" including a measurement result of a "MeasObject", when the mobile station (UE) links and manages a "MeasID", the "MeasObject", and a "ReportConfig", and when the mobile station (UE) determines that the "ReportConfig" is satisfied; and (B) determining, at the mobile station (UE), whether or not to release the "MeasID" according to a type of a carrier designated by the "MeasObject", when a change has occurred in a combination of the primary carrier and the secondary carriers.

4 Claims, 8 Drawing Sheets (51) Int. Cl.
  *H04W 84/08* (2009.01)
  *H04W 80/04* (2009.01)
  *H04L 12/801* (2013.01)

(56) References Cited

OTHER PUBLICATIONS

Official Action letter in counterpart Indonesian Patent Application No. W00201204926 issued on May 2, 2014 (5 pages).
Office Action in counterpart Russian Patent Application No. 2012149612/07(079547) issued on Jun. 16, 2014 (8 pages).
Ericsson, et al.; "Measurements for carrier aggregation"; 3GPP TSG-RAN WG2 #68, R2-100122; Valencia, Spain; Jan. 18-22, 2010 (8 pages).
International Search Report issued in PCT/JP2011/060360 mailed May 31, 2011 (2 pages).
Written Opinion issued in PCT/JP2011/060360 mailed May 31, 2011 (5 pages).
MediaTek Inc.; "Measurement Events Generalization for Carrier Aggregation"; 3GPP TSG-RAN WG2 #69, R2-101146; San Francisco, USA; Feb. 22-26, 2010 (3 pages).
NTT DOCOMO, Inc.; "Measurement handling at inter-frequency handover"; 3GPP TSG RAN WG2 #63bis, R2-085558; Prague, Czech Republic; Sep. 29-Oct. 3, 2008 (10 pages).
3GPP TS 36.331 V9.2.0; "3rd Generation Partnership Project; Technical Specification Group Radio Access Network; Evolved Universal Terrestrial Radio Access (E-UTRA); Radio Resource Control (RRC); Protocol specification (Release 9)"; Mar. 2010 (248 pages).
Japanese Office Action mailed May 31, 2011 in corresponding Japanese Application No. 2010-106003 (7 pages).
Decision of Refusal mailed Dec. 6, 2011 in corresponding Japanese Application No. 2010-106003 (6 pages).
Japanese Office Action mailed May 31, 2011 in corresponding Japanese Application No. 2011-099340, which is a Divisional Application of Japanese Priority Application No. JP2010-106003 (4 pages).
Decision of Refusal mailed Dec. 6, 2011 in corresponding Japanese Application No. 2011-099340 (5 pages).
LG Electronics Inc.; "Serving Cell Handling in CA"; 3GPP TSG RAN WG2 #67bis, R2-095693; Miyazaki, Japan; Oct. 12-16, 2009 (4 pages).
Ericsson, et al.; "System Information Change for Component Carriers"; 3GPP TSG-RAN WG2 #69, R2-101202; San Francisco, USA; Feb. 22-26, 2010 (5 pages).
Ericsson et al.; "Provisioning System Information for component carriers"; 3GPP TSG-RAN WG2 #68, R2-096757; Jeju, Korea; Oct. 9-13, 2009 (3 pages).

* cited by examiner

METHOD AND MOBILE STATION TO CHANGE AND REMOVE A MEASUREMENT ID FOR SUPPORTING CARRIER AGGREGATION

TECHNICAL FIELD

The present invention relates to a mobile communication method and a mobile station.

BACKGROUND ART

In an LTE (Long Term Evolution) Release-8/9 mobile communication system, a radio base station eNB is configured to transmit "MeasConfig" including "MeasObject", "ReportConfig", and "MeasId" to a mobile station UE.

Here, the "MeasObject" is information for designating a measurement object carrier based on RAT and a frequency, the "ReportConfig" is information for designating an event such as A1 to A5 or B1 and B2, or a transmission trigger of "Measurement Report" such as "Periodical".

Figure 7:
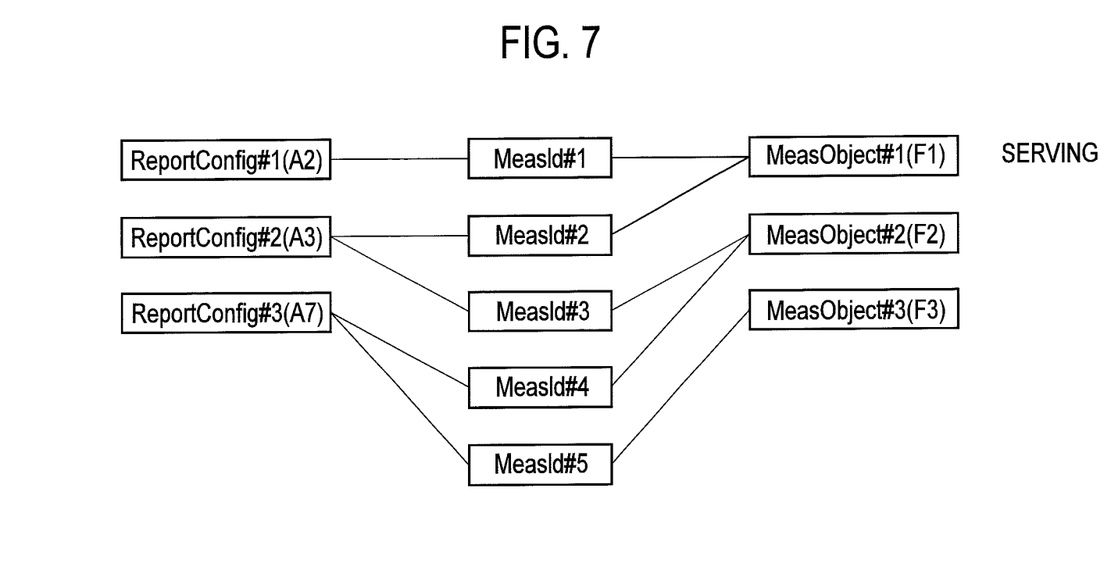
FIG. 7 is a diagram for explaining a state in which measurement configuration is changed in a mobile station in the conventional art.

Furthermore, the "MeasId" is information for linking the "MeasObject" to the "ReportConfig" as shown in FIG. 7.

The mobile station UE is configured to perform only measurement of the "MeasObject" associated with the "ReportConfig" based on the "MeasId".

Here, in the LTE Release-8/9 mobile communication system, when "Inter-frequency Handover (different frequency handover)" or "Inter-frequency Re-establishment (different frequency re-establishment)" has been generated, the mobile station UE is configured to autonomously switch a "MeasId" link destination.

Figure 8:
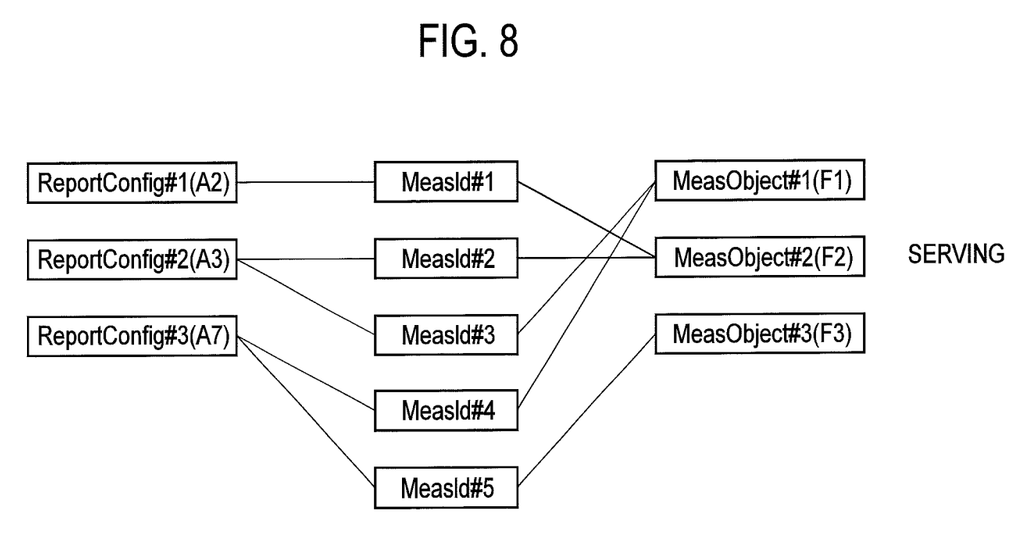
FIG. 8 is a diagram for explaining a state in which measurement configuration is changed in a mobile station in the conventional art.

For example, as shown in FIG. 7 and FIG. 8, when a serving cell (Serving) is changed from a cell in "F1" designated by "MeasObject#1" to a cell in "F2" designated by "MeasObject#2" by the "Inter-frequency Handover" or the "Inter-frequency Re-establishment", the mobile station UE is configured to change a link destination of "MeasId#1" and "MeasId#2" from the "MeasObject#1" to the "MeasObject#2", and change a link destination of "MeasId#3" and "MeasId#4" from the "MeasObject#2" to the "MeasObject#1".

Figure 9:
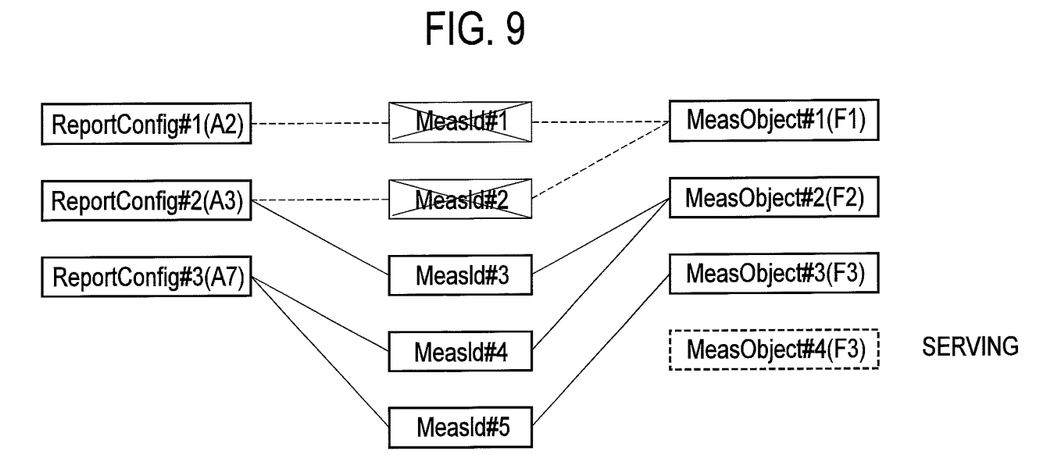
FIG. 9 is a diagram for explaining a state in which measurement configuration is changed in a mobile station in the conventional art.

Furthermore, as shown in FIG. 7 and FIG. 9, when the serving cell (Serving) is changed from the cell in the "F1" designated by the "MeasObject#1" to a cell in "F4", in which the "MeasObject" has not been set, by the "Inter-frequency Handover" or the "Inter-frequency Re-establishment", the mobile station UE is configured to release the "MeasId#1" and the "MeasId#2" linked to the "MeasObject#1".

Then, a radio base station eNB is configured to add "MeasObject#4" for designating the "F4" and link the "MeasId" to the "MeasObject#4" by "RRC Connection Reconfiguration" immediately after "Handover Command" or "Re-establishment".

In an LTE-Advanced scheme (LTE Release-10 scheme) which is a next generation of the LTE Release-8/9 scheme, the mobile station UE is configured to be able to perform CA (Carrier Aggregation) communication with the radio base station eNB by using PCC (a Primary Component Carrier) and one or a plurality of SCCs (Secondary Component Carriers) having different carrier frequencies (EARFCN: E-UTRA Absolute Radio Frequency Channel Number).

Such a CA communication has a problem that since a serving cell exists in each PCC and each SCC, it is not possible to apply a method of switching and a method of releasing the aforementioned "MeasId".

Therefore, the present invention has been achieved in view of the above-described problems, and an object thereof is to provide a mobile communication method and a mobile station, by which it is possible to appropriately switch and release "MeasId" in CA communication.

SUMMARY OF THE INVENTION

A first aspect of the present invention is summarized as a mobile communication method in which a mobile station communicates with a radio base station by using a primary carrier and one or a plurality of secondary carriers having different carrier frequencies, the method including the steps of: (A) transmitting, from the mobile station to the radio base station, a measurement report including a measurement result of a measurement object carrier, when the mobile station links and manages a measurement ID, the measurement object carrier, and a report condition, and when the mobile station determines that the report condition is satisfied; and (B) determining, at the mobile station, whether or not to release the measurement ID according to a type of a carrier designated by the measurement object carrier, when a change has occurred in a combination of the primary carrier and the secondary carriers.

A second aspect of the present invention is summarized as a mobile station, which is configured to communicate with a radio base station by using a primary carrier and one or a plurality of secondary carriers having different carrier frequencies, including: a transmission unit configured to transmit a measurement report including a measurement result of a measurement object carrier to the radio base station, when a measurement ID, the measurement object carrier, and a report condition are linked and managed, and when it is determined that the report condition is satisfied; and a measurement processing unit configured to determine whether or not to release the measurement ID according to a type of a carrier designated by the measurement object carrier, when a change has occurred in a combination of the primary carrier and the secondary carriers.

A third aspect of the present invention is summarized as a mobile communication method, in which a mobile station communicates with a radio base station by using a primary carrier and one or a plurality of secondary carriers having different carrier frequencies, including: a step of releasing, at the mobile station, configuration information related to the secondary carriers when a change has occurred in the combinations of the primary carrier and the secondary carriers.

A fourth aspect of the present invention is summarized as a mobile station, which is configured to be able to communicate with a radio base station by using a primary carrier and one or a plurality of secondary carriers having different carrier frequencies, is configured to release configuration information related to the secondary carriers when a change has occurred in the combinations of the primary carrier and the secondary carriers.

As described above, according to the present invention, it is possible to provide a mobile communication method and a mobile station, with which it is possible to appropriately switch and release "MeasId" in CA communication.

DESCRIPTION OF EMBODIMENTS

Mobile Communication System According to First Embodiment of the Present Invention With reference to FIG. 1 to FIG. 5, the configuration of a mobile communication system according to a first embodiment of the present invention will be described. The mobile communication system according to the present embodiment is an LTE-Advanced (LTE Release-10) mobile communication system.

In the mobile communication system according to the present embodiment, a mobile station UE is configured to be able to perform CA communication by using PCC and one or a plurality of SCCs having different carrier frequencies (EARFCN).

Figure 1:
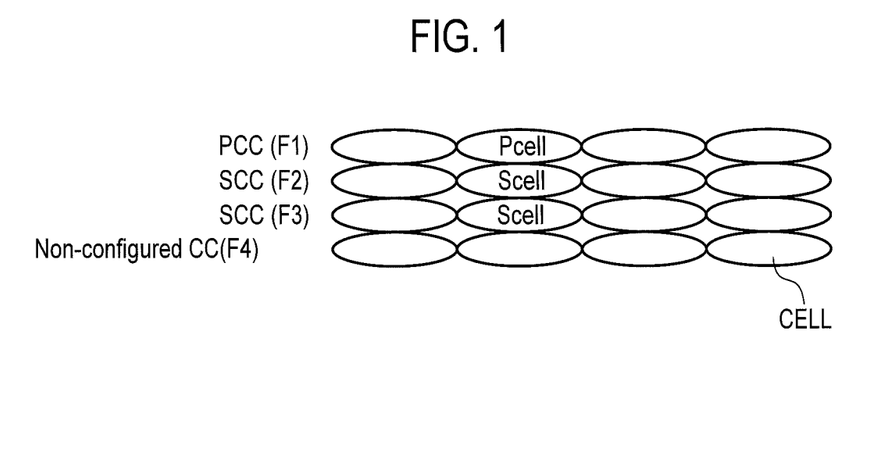
FIG. 1 is a diagram showing the entire configuration of a mobile communication system according to a first embodiment of the present invention.

As shown in FIG. 1, the mobile communication system according to the present embodiment is configured to be able to use CCs of EARFCN #1 through EARFCN #4 during the CA communication.

In the mobile communication system according to the present embodiment, as shown in FIG. 1, the mobile station UE performs CA communication by setting the CC of EARFCN #1 as "PCC", the CC of EARFCN #2 as "SCC #1", and the CC of EARFCN #3 as "SCC #2".

Furthermore, the serving cell in the PCC of the mobile station UE is "Pcell", the serving cell in the SCC #1 of the mobile station UE is "Scell #1", and the serving cell in the SCC #2 of the mobile station UE is "Scell #2".

Figure 2:
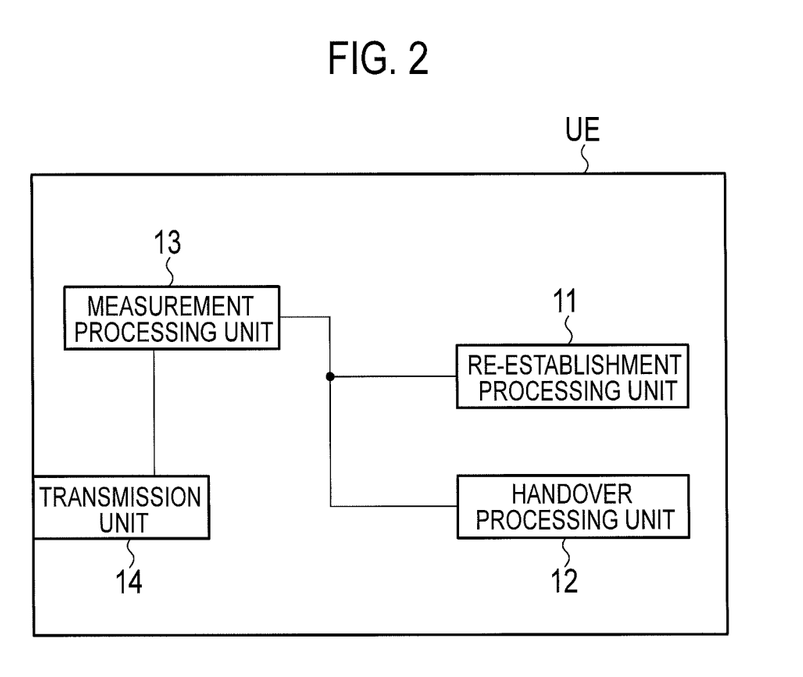
FIG. 2 is a functional block diagram of a mobile station according to the first embodiment of the present invention.

As shown in FIG. 2, the mobile station UE includes a re-establishment processing unit 11, a handover processing unit 12, a measurement processing unit 13, and a transmission unit 14.

The re-establishment processing unit 11 is configured to perform a process related to reconnection (for example, Inter-frequency Re-establishment) of the mobile station UE.

The handover processing unit 12 is configured to perform a process related to handover (for example, Inter-frequency Handover) of the mobile station UE.

The measurement processing unit 13 is configured to perform a measurement process of a measurement object carrier, which has been designated by a "MeasObject", when a "MeasId", the "MeasObject", and a "ReportConfig" are linked and managed.

Furthermore, the measurement processing unit 13 is configured to determine whether or not to release the "MeasId" according to the type of CC designated by the "MeasObject", when a change has occurred in the combinations of the PCC and the SCCs. A detailed determination method will be described later.

The transmission unit 14 is configured to transmit a "Measurement Report" including a measurement result of the "MeasObject" to a radio base station eNB, when the "MeasId", the "MeasObject", and the "ReportConfig" are linked and managed and it is determined that the "ReportConfig" is satisfied.

Hereinafter, with reference to FIG. 3 to FIG. 5, a description will be provided for an operation of the mobile station UE, when a change has occurred in the combinations of the PCC and the SCCs by "Inter-frequency Handover", "Inter-frequency Re-establishment" and the like in the mobile communication system according to the present embodiment.

Figure 3:
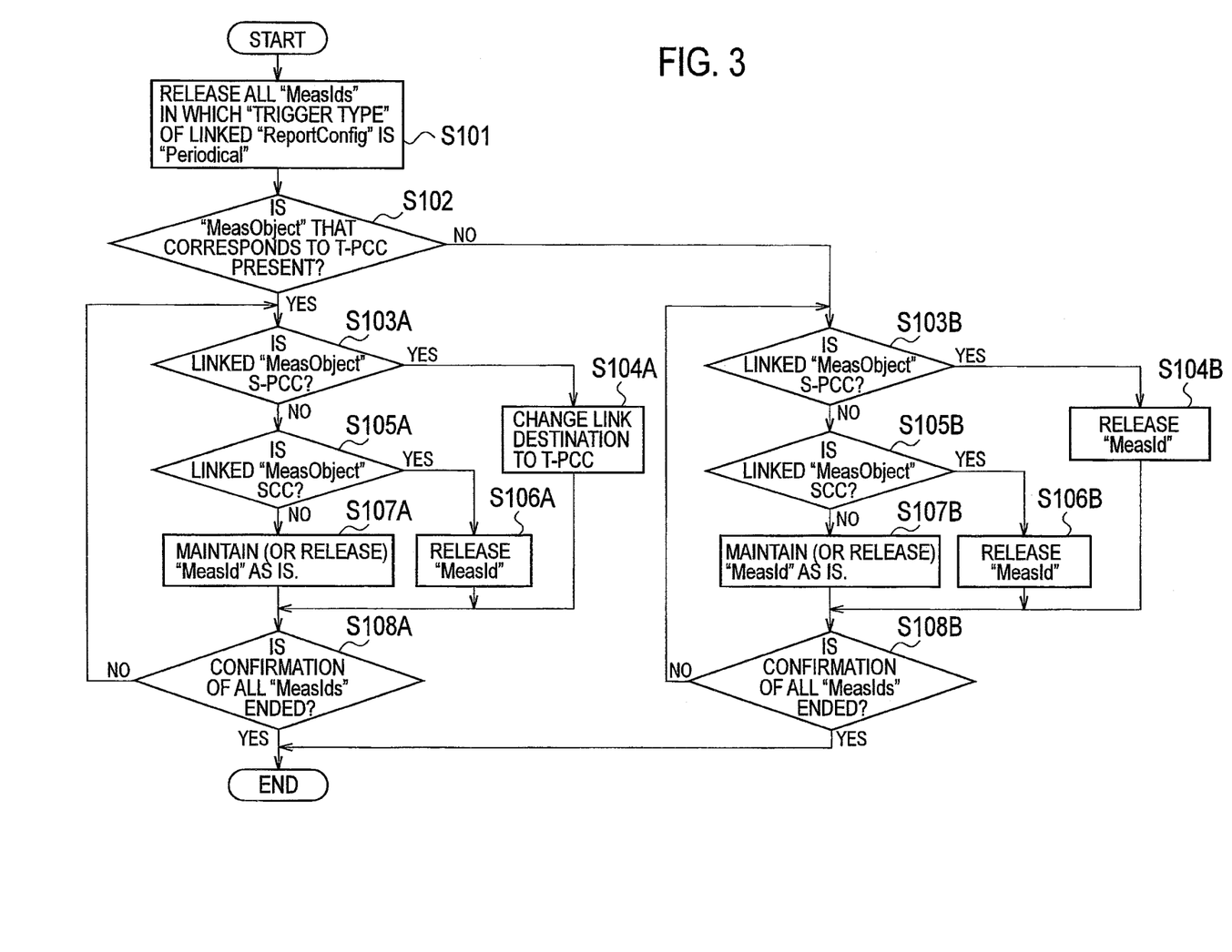
FIG. 3 is a flowchart illustrating an operation of the mobile station according to the first embodiment of the present invention.

As shown in FIG. 3, in step S101, the mobile station UE releases all "MeasIds" linked to the "ReportConfig" with a "trigger type" of "Periodical".

In step S102, the mobile station UE determines whether or not the "MeasObject" for designating PCC (T-PCC) after change is managed.

When it is determined that the "MeasObject" is managed, the present operation proceeds to step S103A. When it is determined that the "MeasObject" is not managed, the present operation proceeds to step S103B.

Then, for each "MeasId" managed by the mobile station UE, operations of steps S103A to S107A or operations of steps S103B to S107B are performed.

In step S103A, the mobile station UE determines whether or not the "MeasObject", to which a corresponding "MeasId" has been linked, designates PCC (S-PCC) before the change.

When it is determined that the "MeasObject" designates the PCC (S-PCC) before the change, the present operation proceeds to step S104A. When it is determined that the "MeasObject" does not designate the PCC (S-PCC) before the change, the present operation proceeds to step S105A.

In step S104A, the mobile station UE changes a link destination of the "MeasId" from the "MeasObject" having designated the S-PCC to the "MeasObject" having designated the T-PCC.

In step S105A, the mobile station UE determines whether or not the "MeasObject", to which the corresponding "MeasId" has been linked, designates the SCC before the change.

When it is determined that the "MeasObject" designates the SCC, the present operation proceeds to step S106A. When it is determined that the "MeasObject" does not designate the SCC, the present operation proceeds to step S107A.

In step S106A, the mobile station UE releases the "MeasId".

In step S107A, the mobile station UE maintains the link destination of the "MeasId" without a change. In addition, in step S107A, the mobile station UE may release the "MeasId".

In step S108A, the mobile station UE determines whether or not the processes of steps S103A to S107A have been performed for all "MeasIds".

When it is determined that the processes of steps S103A to S107A have been performed, the present operation is completed. When it is determined that the processes of steps S103A to S107A have not been performed, the mobile station UE returns to step S103A and performs the processes of steps S103A to S107A for a subsequent "MeasId".

Meanwhile, in step S103B, the mobile station UE determines whether or not the "MeasObject", to which the corresponding "MeasId" has been linked, designates the PCC (S-PCC) before the change.

When it is determined that the "MeasObject" designates the PCC (S-PCC) before the change, the present operation proceeds to step S104B. When it is determined that the "MeasObject" does not designate the PCC (S-PCC) before the change, the present operation proceeds to step S105B.

In step S104B, the mobile station UE releases the "MeasId".

In step S105B, the mobile station UE determines whether or not the "MeasObject", to which the corresponding "MeasId" has been linked, designates the SCC before the change.

When it is determined that the "MeasObject" designates the SCC, the present operation proceeds to step S106B. When it is determined that the "MeasObject" does not designate the SCC, the present operation proceeds to step S107B.

In step S106B, the mobile station UE releases the "MeasId".

In step S107B, the mobile station UE maintains the link destination of the "MeasId" without a change. In addition, in step S107B, the mobile station UE may release the "MeasId".

In step S108B, the mobile station UE determines whether or not the processes of steps S103B to S107B have been performed for all "MeasIds".

When it is determined that the processes of steps S103B to S107B have been performed, the present operation is completed. When it is determined that the processes of steps S103B to S107B have not been performed, the mobile station UE returns to step S103B and performs the processes of steps S103B to S107B for a subsequent "MeasId".

Figure 4:
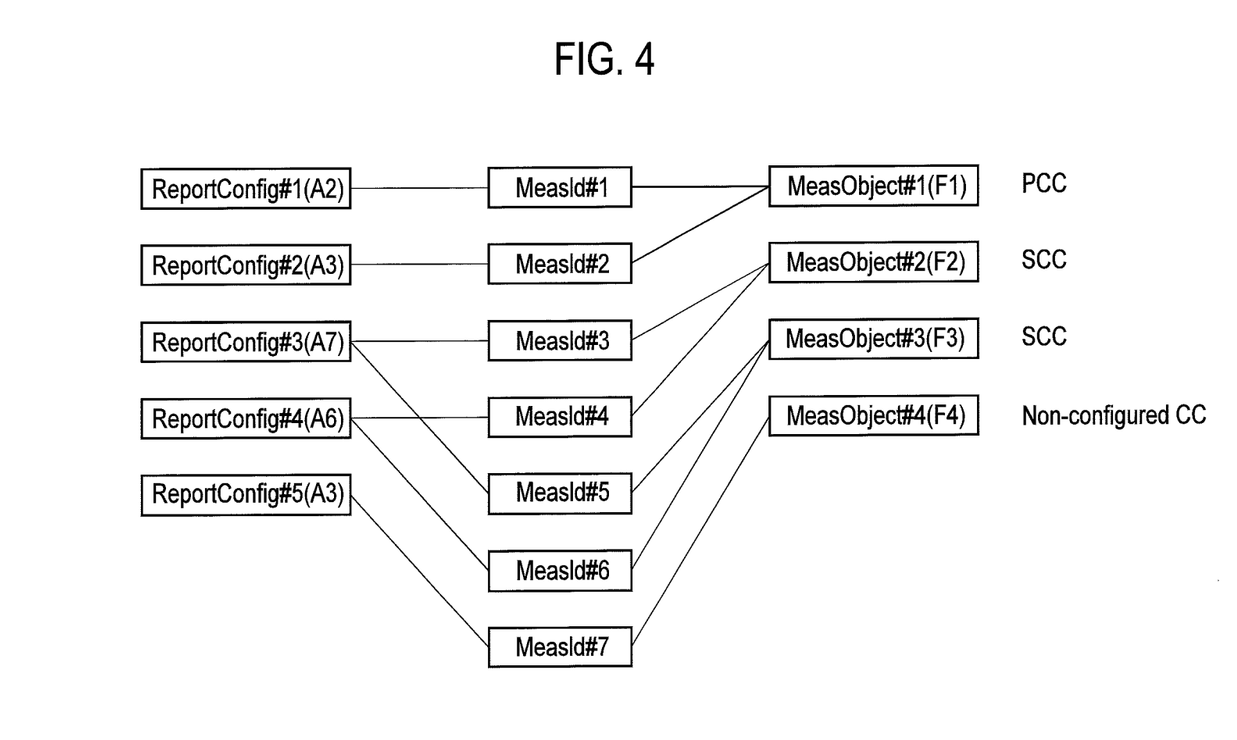
FIG. 4 is a diagram for explaining a state in which measurement configuration is changed in the mobile station according to the first embodiment of the present invention.
Figure 5:
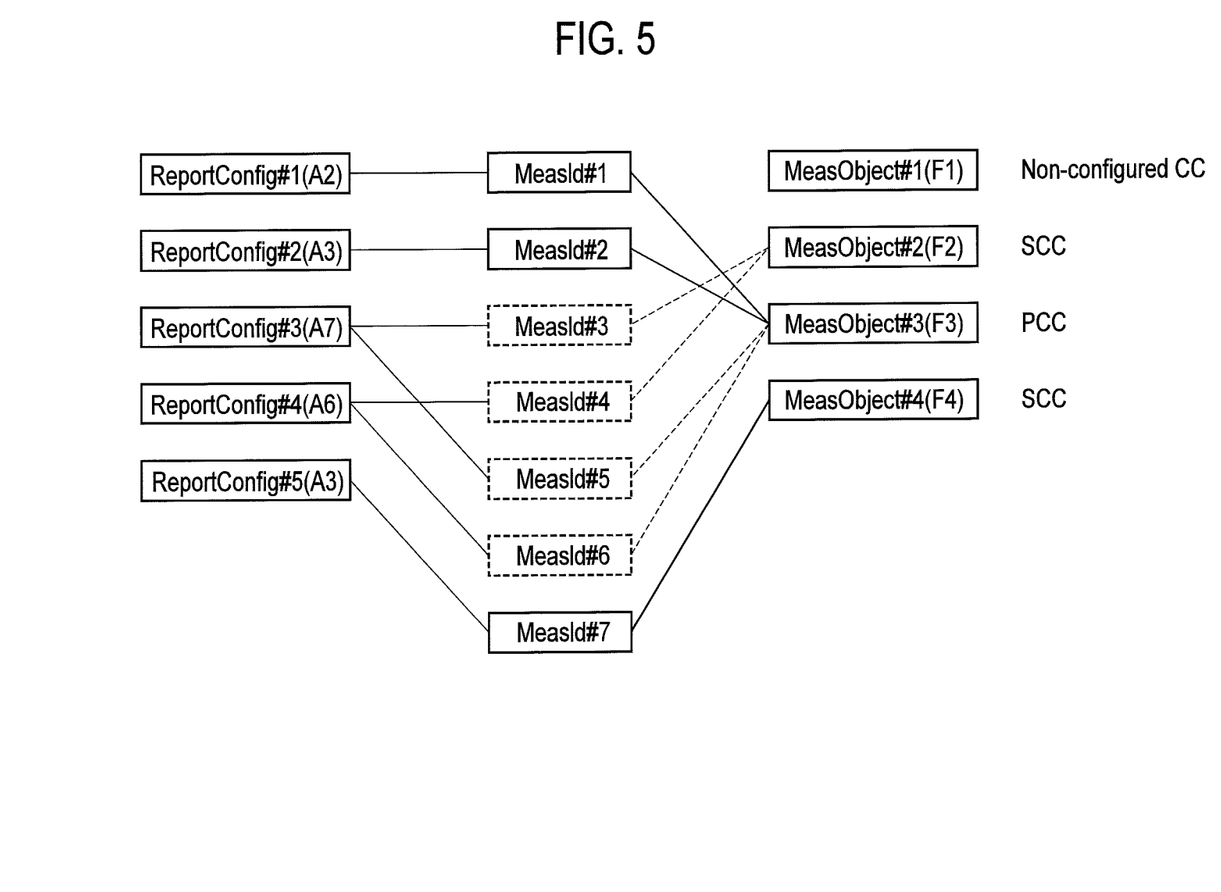
FIG. 5 is a diagram for explaining a state in which measurement configuration is changed in the mobile station according to the first embodiment of the present invention.

Hereafter, with reference to FIG. 4 and FIG. 5, a description will be provided for an example of a method of switching and a method of releasing the "MeasId" by the mobile station UE, when a change has occurred in the combinations of the PCC and the SCCs by the "Inter-frequency Handover", the "Inter-frequency Re-establishment" and the like in the mobile communication system according to the present embodiment.

For example, a description will be provided for a case in which the combinations of the PCC and the SCCs illustrated in FIG. 4 are changed to combinations of the PCC and the SCCs illustrated in FIG. 5. In such a case, "MeasObject#3" for designating the PCC (T-PCC) after the change is managed by the mobile station UE.

In such a case, since "MeasObject#1", to which the "MeasId#1" has been linked, designates the PCC (S-PCC) before the change, the mobile station UE changes the link destination of the "MeasId#1" from the "MeasObject#1" having designated the S-PCC to the "MeasObject#3" having designated the T-PCC.

Similarly, since the "MeasObject#1", to which the "MeasId#2" has been linked, designates the PCC (S-PCC) before the change, the mobile station UE changes the link destination of the "MeasId#2" from the "MeasObject#1" having designated the S-PCC to the "MeasObject#3" having designated the T-PCC.

Furthermore, since "MeasObject#2", to which "MeasId#3" and "MeasId#4" have been linked, designates the SCC before the change, the mobile station UE releases the "MeasId#3" and the "MeasId#4".

Similarly, since "MeasObject#3", to which "MeasId#5" and "MeasId#6" have been linked, designates the SCC before the change, the mobile station UE releases the "MeasId#5" and the "MeasId#6".

Furthermore, since "MeasObject#4", to which "MeasId#7" has been linked, designates Non-configured CC, the mobile station UE maintains the link destination of the "MeasId#7" without a change.

Even in such a case, the mobile station UE may release the "MeasId#7".

In addition, when "MeasConfig" has been newly notified at the time of the "Inter-frequency Handover", the "Inter-frequency Re-establishment" and the like, the mobile station UE applies the "MeasConfig" after performing the procedure described above in detail.

In accordance with the mobile communication system according to the present embodiment, when a change has occurred in the combinations of the PCC and the SCCs by the "Inter-frequency Handover", the "Inter-frequency Re-establishment" and the like, it is possible for the mobile station UE to appropriately switch and release the "MeasId" based on the type of CC of the link destination of the "MeasId".

Mobile Communication System According to
Second Embodiment of the Present Invention Hereinafter, with reference to FIG. 6, the mobile communication system according to a second embodiment of the present invention will be described while focusing on the difference from the mobile communication system according to the above-mentioned first embodiment.

Hereinafter, with reference to FIG. 6, a description will be provided for an operation of the mobile station UE when a change has occurred in the combinations of the PCC and the SCCs by "Inter-frequency Handover", "Inter-frequency Re-establishment" and the like in the mobile communication system according to the present embodiment.

Figure 6:
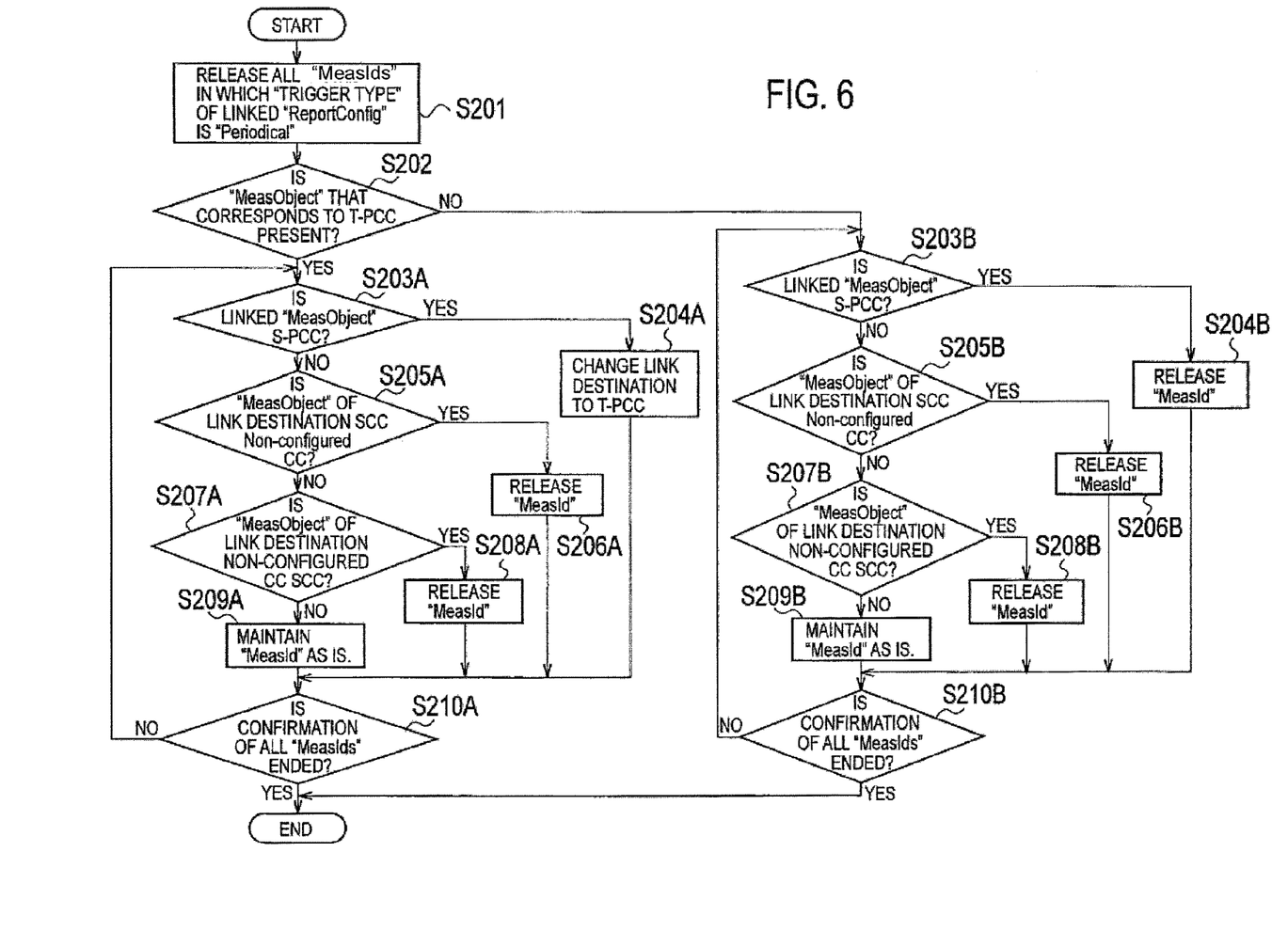
FIG. 6 is a flowchart illustrating an operation of a mobile station according to a second embodiment of the present invention.

As shown in FIG. 6, in step S201, the mobile station UE releases all "MeasIds" linked to the "ReportConfig" with a "trigger type" of "Periodical".

In step S202, the mobile station UE determines whether or not the "MeasObject" for designating PCC (T-PCC) after change is managed.

When it is determined that the "MeasObject" is managed, the present operation proceeds to step S203A. When it is determined that the "MeasObject" is not managed, the present operation proceeds to step S2033.

Hereinafter, for each "MeasId" managed by the mobile station UE, operations of steps S203A to S210A or operations of steps S203B to S210B are performed.

In step S203A, the mobile station UE determines whether or not the "MeasObject", to which a corresponding "MeasId" has been linked, designates PCC (S-PCC) before the change.

When it is determined that the "MeasObject" designates the PCC (S-PCC) before the change, the present operation proceeds to step S204A. When it is determined that the "MeasObject" does not designate the PCC (S-PCC) before the change, the present operation proceeds to step S205A.

In step S204A, the mobile station UE changes a link destination of the "MeasId" from the "MeasObject" having designated the S-PCC to the "MeasObject" having designated the T-PCC.

In step S205A, the mobile station UE determines whether or not CC designated by the "MeasObject", to which the corresponding "MeasId" has been linked, has been changed from SCC to Non-configured CC.

When it is determined that the CC has been changed from the SCC to the Non-configured CC, the present operation proceeds to step S206A. When it is determined that the CC has not been changed from the SCC to the Non-configured CC, the present operation proceeds to step S207A.

In step S206A, the mobile station UE releases the "MeasId".

In step S207A, the mobile station UE determines whether or not the CC designated by the "MeasObject", to which the corresponding "MeasId" has been linked, has been changed from the Non-configured CC to the SCC.

When it is determined that the CC has been changed from the Non-configured CC to the SCC, the present operation proceeds to step S208A. When it is determined that the CC has not been changed from Non-configured CC to the SCC, the present operation proceeds to step S209A.

In step S208A, the mobile station UE releases the "MeasId".

In step S209A, the mobile station UE maintains the link destination of the "MeasId" without a change. In addition, in step S209A, the mobile station UE may release the "MeasId".

In step S210A, the mobile station UE determines whether or not the processes of steps S203A to S210A have been performed for all "MeasIds".

When it is determined that the processes of steps S203A to S210A have been performed, the present operation is completed. When it is determined that the processes of steps S203A to S210A have not been performed, the mobile station UE returns to step S203A and performs the processes of steps S203A to S210A for a subsequent "MeasId".

Meanwhile, in step S203B, the mobile station UE determines whether or not the "MeasObject", to which the corresponding "MeasId" has been linked, designates the PCC (S-PCC) before the change.

When it is determined that the "MeasObject" designates the PCC (S-PCC) before the change, the present operation proceeds to step S204B. When it is determined that the "MeasObject" does not designate the PCC (S-PCC) before the change, the present operation proceeds to step S205B.

In step S204B, the mobile station UE releases the "MeasId".

In step S205B, the mobile station UE determines whether or not the CC designated by the "MeasObject", to which the corresponding "MeasId" has been linked, has been changed from the SCC to the Non-configured CC.

When it is determined that the CC has been changed from the SCC to the Non-configured CC, the present operation proceeds to step S206B. When it is determined that the CC has not been changed from the SCC to the Non-configured CC, the present operation proceeds to step S207B.

In step S206B, the mobile station UE releases the "MeasId".

In step S207B, the mobile station UE determines whether or not the CC designated by the "MeasObject", to which the corresponding "MeasId" has been linked, has been changed from the Non-configured CC to the SCC.

When it is determined that the CC has been changed from the Non-configured CC to the SCC, the present operation proceeds to step S208B. When it is determined that the CC has not been changed from Non-configured CC to the SCC, the present operation proceeds to step S209B.

In step S208B, the mobile station UE releases the "MeasId".

In step S209B, the mobile station UE maintains the link destination of the "MeasId" without a change. In addition, in step S209B, the mobile station UE may release the "MeasId".

In step S210B, the mobile station UE determines whether the processes of steps S203B to S210B have been performed for all "MeasIds".

When it is determined that the processes of steps S203B to S210B have been performed, the present operation is completed. When it is determined that the processes of steps S203B to S210B have not been performed, the mobile station UE returns to step S203B and performs the processes of steps S203B to S210B for a subsequent "MeasId".

In addition, when "MeasConfig" has been newly notified at the time of the "Inter-frequency Handover", the "Inter-frequency Re-establishment" and the like, the mobile station UE applies the "MeasConfig" after performing the procedure described above in detail.

Mobile Communication System According to Third Embodiment of the Present Invention Hereinafter, the mobile communication system according to a third embodiment of the present invention will be described while focusing on the difference from the mobile communication system according to the above-mentioned first embodiment.

In the mobile communication system according to the present embodiment, when a change has occurred in the combinations of the PCC and the SCCs by "Inter-frequency Handover", "Inter-frequency Re-establishment" and the like, the mobile station UE is configured to release other types of configuration information related to the SCCs.

That is, the mobile station UE releases configuration information related to the changed SCCs, such as configuration information "RadioResourceConfigDedicated" or "RadioResourceConfigCommon" of L1/L2 related to the SCCs, or broadcast information "SystemInformation" related to the SCCs.

Alternatively, the mobile station UE may be configured to release all types of configuration information related to the SCCs.

The aspects of the present embodiment as described above may be expressed as follows.

The first aspect of the present embodiment is summarized as a mobile communication method, in which a mobile station UE performs CA communication with a radio base station eNB by using PCC (a primary carrier) and one or a plurality of SCCs (secondary carriers) having different carrier frequencies, including the steps of: (A) transmitting, from the mobile station UE to the radio base station eNB, "Measurement Report" including a measurement result of "MeasObject (a measurement object carrier)", when "MeasId (a measurement ID)", the "MeasObject", and "ReportConfig (a report condition)" are linked and managed, and when it is determined that the "ReportConfig" is satisfied; and (B) determining, at the mobile station UE, whether or not to release the "MeasId" according to the type of CC designated by the "MeasObject", when a change has occurred in the combinations of the PCC and the SCCs.

In the first aspect of the present embodiment, in the step (B), when the mobile station UE links and manages "MeasId#1 (a first measurement ID)", "MeasObject#1 (a first measurement object carrier)" for designating "F1 (a first carrier)", and "ReportConfig#1 (a first report condition)", when the PCC is changed from the "F1" to "F3 (a second carrier)", and when the mobile station UE manages "MeasObject#3 (a second measurement object carrier)" for designating the "F3", the mobile station UE may change the link destination of the "MeasId#1" from the "MeasObject#1" to "MeasObject#3".

In the first aspect of the present embodiment, in the step (B), when the mobile station UE links and manages the "MeasId#1", the "MeasObject#1" for designating the "F1", and the "ReportConfig#1", when the PCC is changed from the "F1" to the "F3", and when the mobile station UE does not manage the "MeasObject#3" for designating the "F3", the mobile station UE may release the "MeasId#1".

In the first aspect of the present embodiment, in the step B, when the "MeasObject#3", to which "MeasId#5/#6" has been linked, designates the "SCC", the mobile station UE may release the "MeasId#5/#6".

In the first aspect of the present embodiment, in the step (B), when SCC designated by the "MeasObject" is continued as SCC even after a change in the combinations of the PCC and the SCCs, the mobile station UE may maintain the link destination of the "MeasId" linked to the "MeasObject" without a change.

In the first characteristic of the present embodiment, in the step B, when "MeasObject#4", to which "MeasId#7" has been linked, designates a carrier (Nonconfigured CC) other than the PCC and the SCCs, the mobile station UE may maintain the link destination of the "MeasId#7" without a change.

In the first aspect of the present embodiment, in the step (B), when the carrier (Non-configured CC), other than the PCC and the SCCs designated by the "MeasObject", is SCC after a change in the combinations of the PCC and the SCCs, the mobile station UE may release the "MeasId" linked to the "MeasObject".

The second aspect of the present embodiment is summarized as a mobile station UE, which is configured to be able to perform CA communication with a radio base station eNB by using PCC and one or a plurality of SCCs having different carrier frequencies, including: a transmission unit 14 configured to transmit "Measurement Report" including a measurement result of "MeasObject" to the radio base station eNB, when "MeasId", the "MeasObject", and "ReportConfig" are linked and managed, and when it is determined that the "ReportConfig" is satisfied; and a measurement processing unit 13 configured to determine whether or not to release the "MeasId" according to the type of CC designated by the "MeasObject", when a change has occurred in the combinations of the PCC and the SCCs.

In the second aspect of the present embodiment, when "MeasId#1", "MeasObject#1" for designating "F1", and "ReportConfig#1" are linked and managed by the mobile station UE, when the PCC is changed from the "F1" to "F3", and when "MeasObject#3" for designating the "F3" is managed by the mobile station UE, the measurement process unit 13 may be configured to change the link destination of the "MeasId#1" from the "MeasObject#1" to "MeasObject#3".

In the second aspect of the present embodiment, when the "MeasId#1", the "MeasObject#1" for designating the "F1", and the "ReportConfig#1" are linked and managed by the mobile station UE, when the PCC is changed from the "F1" to the "F3", and when the "MeasObject#3" for designating the "F3" is not managed by the mobile station UE, the measurement processing unit 13 may be configured to release the "MeasId#1".

In the second aspect of the present embodiment, when the "MeasObject#3", to which "MeasId#5/#6" has been linked, designates the "SCC", the measurement processing unit 13 may be configured to release the "MeasId#5/#6"

In the second aspect of the present embodiment, when SCC designated by the "MeasObject" is continued as SCC even after a change in the combinations of the PCC and the SCCs, the measurement processing unit 13 may be configured to maintain the link destination of the "MeasId" linked to the "MeasObject" without a change.

In the second aspect of the present embodiment, when "MeasObject#4", to which "MeasId#7" has been linked, designates a carrier (Non-configured CC) other than the PCC and the SCCs, the measurement processing unit 13 may be configured to maintain the link destination of the "MeasId#7" without a change.

In the second aspect of the present embodiment, when the carrier (Non-configured CC), other than the PCC and the SCCs designated by the "MeasObject", is SCC after a change in the combinations of the PCC and the SCCs, the measurement processing unit 13 may be configured to release the "MeasId" linked to the "MeasObject".

The third aspect of the present embodiment is summarized as a mobile communication method, in which a mobile station UE performs CA communication with a radio base station eNB by using PCC and one or a plurality of SCCs having different carrier frequencies, including: a step of releasing, at the mobile station UE, configuration information related to the SCCs, when a change has occurred in the combinations of the PCC and the SCCs.

The fourth aspect of the present embodiment is summarized as a mobile station UE, which is configured to be able to perform CA communication with a radio base station eNB by using PCC and one or a plurality of SCCs having different carrier frequencies, configured to release configuration information related to the SCCs, when a change has occurred in the combinations of the PCC and the SCCs.

Note that the operation of the mobile station UE or the radio base station eNB may be performed by hardware, a software module performed by a processor, or a combination thereof.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such storage medium and processor may be arranged in an ASIC. The ASIC may be arranged in the mobile station UE or the radio base station eNB. Furthermore, such storage medium and processor may be arranged in the mobile station UE or the radio base station eNB as discrete components.

Thus, the present invention has been explained in detail by using the above-described embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

INDUSTRIAL APPLICABILITY

As described above, according to the present invention, it is possible to provide a mobile communication method and a mobile station, with which it is possible to appropriately switch and release "MeasId" in CA communication.

REFERENCE SIGNS LIST eNB . . . Radio base station
UE . . . Mobile station
11 . . . Re-establishment processing unit
12 . . . Handover processing unit 13 ... Measurement processing unit
14 ... Transmission unit

The invention claimed is:

1. A mobile communication method in which a mobile station communicates with a radio base station by using a primary carrier and one or a plurality of secondary carriers having different carrier frequencies, ID, the method comprising the steps of:
  managing, at a mobile station, a MeasID which links a MeasObject and a ReportConfig to transmit a measurement report including a measurement result of the linked MeasObject to the radio base station, when the mobile station determines that the linked ReportConfig is satisfied;
  changing, at the mobile station, a link destination of a MeasID linking a MeasObject indicating a Second-Primary Component Carrier (S-PCC) to a MeasObiect indicating a Third-Primary Component Carrier (T-PCC) when the primary carrier changes from the S-PCC to the T-PCC, and the mobile station manages the MeasObject indicating the T-PCC; and
  releasing, at the mobile station, a MeasID linking, a MeasObiect indicating a carrier selected from among the plurality of secondary carriers third measurement ID, when the and when the selected carrier is changed to a non-configured carrier,
  wherein the mobile station does not measure the selected carrier until the mobile station acquires a new MeasID which links a new MeasObject and a new ReportConfig from the radio base station, the new MeasObject indicates a new carrier.

2. A mobile communication method in which a mobile station communicates with a radio base station by using a primary carrier and one or a plurality of secondary carriers having different carrier frequencies,
  the method comprising the steps of:
  managing, at a mobile station, a MeasID which links a MeasObiect and a ReportConfig to transmit a measurement report including a measurement result of the linked MeasObject to the radio base station, when the mobile station determines that the linked ReportConfig is satisfied;
  releasing, at the mobile station, a MeasID linking a MeasObject indicating a S-PCC when the primary changes from the Second-Primary Component Carrier (S-PCC) to a Third-Primary Component Carrier (T-PCC) and the mobile station does not manage a MeasObiect indicating the T-PCC; and
  releasing, at the mobile station, a MeasID linking a MeasObiect indicating a carrier selected from among the plurality of secondary carriers when the selected carrier third carrier is changed the to a non-configured carrier,
  wherein the mobile station does not measure the selected carrier until the mobile station acquires a new MeasID which links a new MeasObiect and a new ReportConfig from the radio base station, the new MeasObject indicates a new carrier.

3. A mobile station, which is configured to communicate with a radio base station by using a primary carrier and one or a plurality of secondary carriers having different carrier frequencies, comprising:
  a transmitter that manages a MeasID which links a MeasObject and a ReportConfig and transmits a measurement report including a measurement result of the linked MeasObiect to the radio base station, when the mobile station determines that the linked ReportConfig is satisfied; and
  a measurement processor that changes to change a link destination of a MeasID linking a MeasObiect indicating a Second-Primary Component Carrier (S-PCC) to a MeasObiect indicating a Third-Primary Component Carrier (T-PCC) when the primary carrier changes from the S-PCC to the T-PCC and the mobile station manages the MeasObject indicating the T-PCC, wherein
  the measurement processor releases a MeasID linking a MeasObject indicating a carrier selected from among the plurality of secondary carriers when the selected carrier is changed to a non-configured carrier and does not measure the selected carrier until the mobile station acquires a new MeasID which links a new MeasObject and a new ReportConfig from the radio base station, the new MeasObject indicates a new carrier.

4. A mobile station, which is configured to communicate with a radio base station by using a primary carrier and one or a plurality of secondary carriers having different carrier frequencies, comprising:
  a transmitter that manages a MeasID which links a MeasObject and a ReportConfig and transmits a measurement report including a measurement result of the linked MeasObjeet to the radio base station when the mobile station determines d that the linked ReportConfig is satisfied; and
  a measurement processor that releases a MeasID linking a MeasObiect indicating a Second-Primary Component Carrier (S-PCC) when the primary carrier changes from the S-PCC to a Third-Primary Component Carrier (T-PCC) and the mobile station does not manage a MeasObject indicating the T-PCC, wherein
  the measurement processor releases a MeasID linking a MeasObject indicating a carrier selected from among the plurality of secondary carriers to a non-configured carrier and does not measure the selected carrier until the mobile station acquires a new MeasID which links a new MeasObject and a new ReportConfig from the radio base station, the new MeasObject indicates a new carrier.

* * * * *